US008861704B2

(12) United States Patent
Jones et al.

(10) Patent No.: US 8,861,704 B2
(45) Date of Patent: Oct. 14, 2014

(54) SYSTEMS, METHODS, AND COMPUTER PROGRAMS FOR TRANSITIONING FROM A PHONE-ONLY MODE TO A WEB CONFERENCE MODE

(71) Applicant: American Teleconferencing Services, Ltd., Atlanta, GA (US)

(72) Inventors: Boland T. Jones, Atlanta, GA (US); David Michael Guthrie, Norcross, GA (US); Tammy Hammond, Atlanta, GA (US); Peter Stewart, Berkeley Lake, GA (US)

(73) Assignee: American Teleconferencing Services, Ltd., Atlanta, GA (US)

( * ) Notice: Subject to any disclaimer, the term of this patent is extended or adjusted under 35 U.S.C. 154(b) by 0 days.

(21) Appl. No.: 13/832,469

(22) Filed: Mar. 15, 2013

(65) Prior Publication Data
US 2013/0202095 A1 Aug. 8, 2013

Related U.S. Application Data

(63) Continuation-in-part of application No. 12/771,522, filed on Apr. 30, 2010, now Pat. No. 8,626,847.

(51) Int. Cl.
| | |
|---|---|
| *H04M 3/42* | (2006.01) |
| *H04N 7/14* | (2006.01) |
| *H04L 29/06* | (2006.01) |
| *H04M 3/56* | (2006.01) |
| *H04L 12/18* | (2006.01) |

(52) U.S. Cl.
CPC ............ *H04M 3/563* (2013.01); *H04L 65/1083* (2013.01); *H04M 2201/40* (2013.01); *H04M 2250/22* (2013.01); *H04M 2203/254* (2013.01); *H04M 2203/5009* (2013.01); *H04M 2250/62* (2013.01); *H04M 2203/5027* (2013.01); *H04L 65/4053* (2013.01); *H04L 12/1822* (2013.01)
USPC .................................. 379/204.01; 348/14.08

(58) Field of Classification Search
CPC ........ H04M 3/56; H04M 3/567; H04M 3/568
USPC .......... 379/202.01, 204.01; 348/14.01, 14.03, 348/14.08, 14.11
See application file for complete search history.

(56) References Cited

U.S. PATENT DOCUMENTS

| | | | |
|---|---|---|---|
| 2006/0177032 A1* | 8/2006 | Abramson et al. ........ | 379/201.01 |
| 2009/0220066 A1* | 9/2009 | Shaffer et al. ............ | 379/204.01 |
| 2011/0019810 A1* | 1/2011 | Alexandrov et al. ..... | 379/204.01 |
| 2012/0218375 A1* | 8/2012 | Hetherington et al. .... | 348/14.12 |

* cited by examiner

*Primary Examiner* — Quoc D Tran
(74) *Attorney, Agent, or Firm* — Smith Risley Tempel Santos LLC

(57) ABSTRACT

Various embodiments of systems, methods, and computer programs are disclosed for transitioning from a phone-only mode to a web conference mode. One embodiment is a method for participating in an audio conference comprising: a conferencing system establishing an audio conference between a plurality of participants via a communication network, at least one of the participants participating in the audio conference in a phone-only mode; and a server in communication with the conferencing system presenting to the phone-only participant, via a user interface on a computing device, a phone-only control menu for enabling the phone-only participant to selectively transition from the phone-only mode to a web conferencing mode.

29 Claims, 9 Drawing Sheets

Meeting Invitation

From: sender@email.com
To: recipient@email.com
Subject: recipient@email.com

You've been invited to a phone-only meeting.

When: Monday, September 19 from 1:30 - 2:00 (EST).

Click one of these choices or join via the dial-in information below.

Join By Computer ← 302    Join By Mobile ← 304    Join By iPhone ← 306

DIAL-IN INFORMATION

Access Number: _308_

Guest Passcode: _310_

Web Address: _312_
(for phone-only controls)

*FIG. 3*

LET THE MEETING CALL YOU

Name: _402_

Email: _404_

Country Code: _406_ ▶

Phone: _408_

[ CONNECT ME ] ← 410

<u>Dial-In Old School</u> ← 412

SYSTEMS, METHODS, AND COMPUTER PROGRAMS FOR TRANSITIONING FROM A PHONE-ONLY MODE TO A WEB CONFERENCE MODE

CROSS-REFERENCE TO RELATED APPLICATIONS

This application is a continuation-in-part of and claims the benefit of the priority of U.S. patent application Ser. No. 12/771,522, entitled "Transferring a Conference Session Between Client Devices" and filed Apr. 30, 2010, which is hereby incorporated by referenced in its entirety.

BACKGROUND

Currently, there are a number of conference solutions for enabling people to conduct live meetings, conferences, presentations, or other types of gatherings via the Internet, the public switched telephone network (PSTN), or other voice and/or data networks. Participants typically use a telephone, computer, or other communication device that connects to a conference system. The meetings include an audio component and a visual component, such as, a shared presentation, video, whiteboard, or other multimedia, text, graphics, etc. These types of convenient conference solutions have become an indispensable form of communication for many businesses and individuals.

Despite the many advantages and commercial success of existing conference, meeting, grouping or other types of gathering systems, there remains a need in the art for improved conference, meeting, grouping or other types of gathering systems, methods, and computer programs.

SUMMARY

Various embodiments of systems, methods, and computer programs are disclosed for transitioning from a phone-only mode to a web conference mode. One embodiment is a method for participating in an audio conference comprising: a conferencing system establishing an audio conference between a plurality of participants via a communication network, at least one of the participants participating in the audio conference in a phone-only mode; and a server in communication with the conferencing system presenting to the phone-only participant, via a user interface on a computing device, a phone-only control menu for enabling the phone-only participant to selectively transition from the phone-only mode to a web conferencing mode.

Another embodiment is a computer program embodied in a computer readable medium and executable by a processor for providing an audio conference. The computer comprises logic configured to: establish an audio conference between a plurality of participants via a communication network, at least one of the participants participating in the audio conference in a phone-only mode; present to the phone-only participant, via a user interface on a computing device, a phone-only control menu for enabling the phone-only participant to selectively transition from the phone-only mode to a web conferencing mode; receive the transition request initiated via the phone-only control menu; and in response to the transition request, present a web conference user interface to the computing device.

A further embodiment is a computer system comprising a conferencing system and a server. The conferencing system establishes an audio conference between a plurality of participants via a communication network. At least one of the participants participates in the audio conference in a phone-only mode. The server is configured to communicate with the conferencing system and present to the phone-only participant, via a user interface on a computing device, a phone-only control menu for enabling the phone-only participant to selectively transition from the phone-only mode to a web conferencing mode.

BRIEF DESCRIPTION OF THE DRAWINGS

FIG. 3 is a screen shot of an exemplary method for inviting a participant to join a phone-only meeting provided via the conferencing system of FIG. 1.

FIG. 4 is a screen shot illustrating an embodiment of a user interface for connecting to the phone-only meeting.

DETAILED DESCRIPTION

Figure 1:
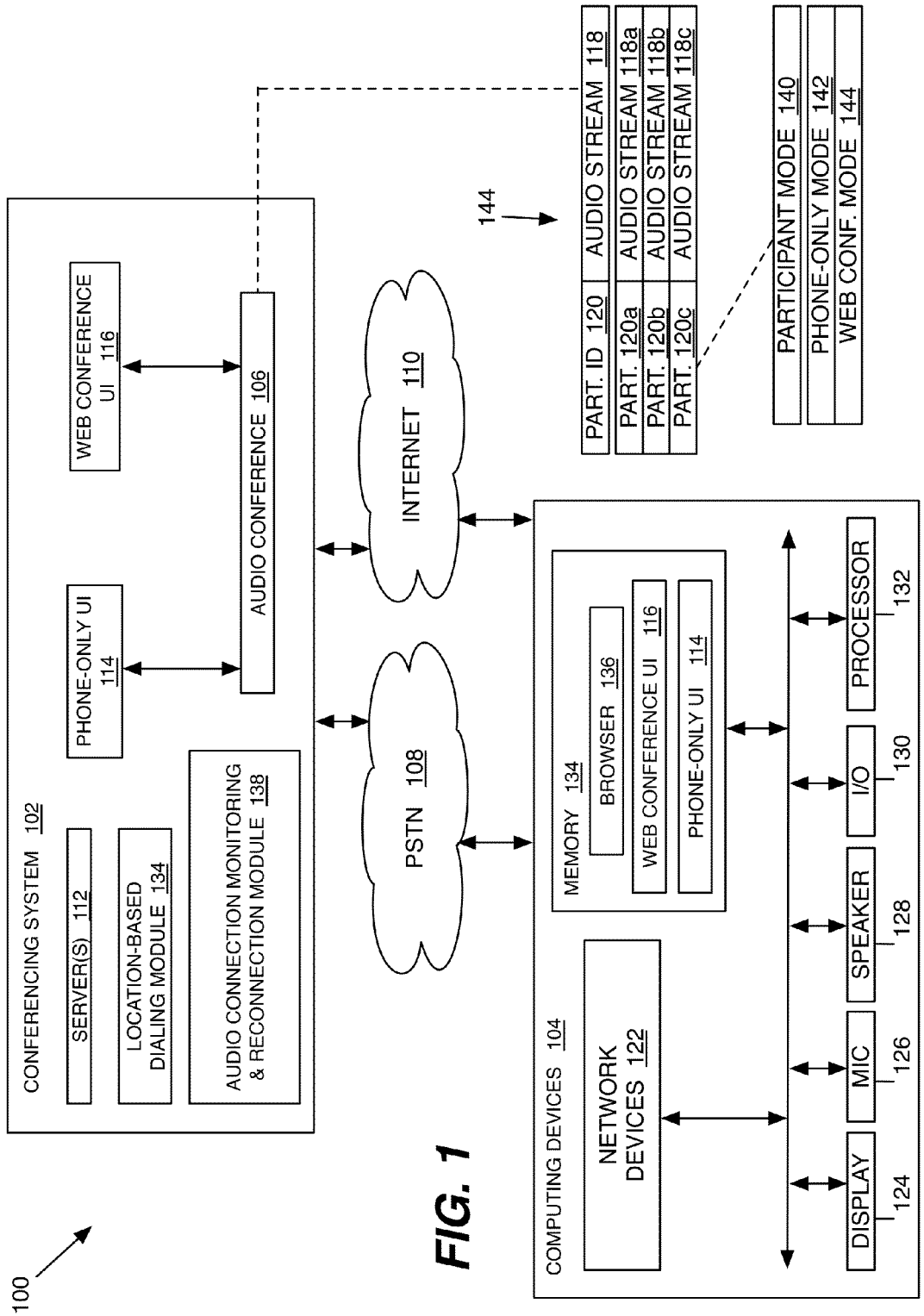
FIG. 1 is a block diagram illustrating a conferencing system for enabling a participant to transition from a phone-only mode to a web conference mode.

Various embodiments of systems, methods, and computer programs are disclosed for enabling a participant in a conference to selectively transition between a phone-only mode and a web conference mode. The conference or online conference may comprise an audio conference with a corresponding online or web conference component for enabling participants to interact with each other via a conference user interface that provides various web conference functionality and features, as known in the art and described in the above-referenced parent application, which is hereby incorporated by reference in its entirety. The participants may join the audio conference in a phone-only mode or a web conference mode. In the phone-only mode, a participant only experiences the audio conference without experiencing the web conference. In the web conference mode, a participant experiences both the audio conference and the web conference.

It should be appreciated that the audio conference and/or the web conference may be generally referred to as a conference or an online conference. The terms "phone-only mode" and "web conference mode" generally refer to the particular manner in which participants join and/or access the conference. The conference, online conference, and/or audio conference may be used for conferences, meetings, groupings or other types gatherings (collectively, a "conference" with a conferencing system). The conferencing system provides separate user interfaces to the participants (via a computing device, mobile phone, etc.) depending on whether the participant is in the phone-only mode or the web conference. As described below in more detail, participants in the phone-only mode may access a specially-configured user interface with reduced functionality and/or control features designed for the phone-only mode (referred to as a "phone-only user interface"). Participants in the web conference mode may access a more interactive user interface designed for the web conference mode (referred to as a "web conference user interface").

In an embodiment, the phone-only user interface may comprise a simplified user experience for accessing a limited set of control features related to the audio conference. For example, the phone-only user interface may comprise a phone-only control menu that displays a list of participants in the audio conference with a limited set of control features. A mute/unmute control may enable the phone-only participant to selectively mute and/or unmute their corresponding audio connection. A disconnect control may enable the phone-only participant to disconnect their audio connection and leave the audio conference. The phone-only control menu may further comprise a user interface control, button, etc. for enabling the phone-only participant to selectively transition from the phone-only mode to the web conference mode. When a transition request is initiated via the phone-only user interface and received by the conferencing system, the conferencing system and/or associated servers may change the participant's mode from the phone-only mode to the web conference mode. In response, the conferencing system may automatically change the participant's user experience replacing the phone-only user interface with the web conference user interface.

It should be appreciated that the selective transition between a phone-only mode and a web conference mode may be desirable to accommodate individual user preferences, host preferences, individual participant computing device limitations, individual participant network bandwidth limitations, different types of conferences, different levels of user accounts, etc. For example, a provider of the conferencing system may leverage the selective transition from a phone-only mode to a web conference mode as, for example, a promotional offer, an account upgrade, or as a standalone user feature.

FIG. 1 illustrates an embodiment of a computer system 100 comprising a conferencing system 102 configured to establish an audio conference 106 between one or more participants accessing the conferencing system 102 via a corresponding computing device 104. The computing devices 104 may be connected to the conferencing system 102 and/or associated server(s) 112 via one or more communication networks (e.g., the Internet 110, the Public Switched Telephone Network (PSTN), etc.). The communication network(s) 106 may support wired and/or wireless communication via any suitable protocols, including, for example, the Internet, the Public Switched Telephone Network (PSTN), cellular or mobile network(s), local area network(s), wide area network(s), VoIP, or any other suitable communication protocols, service providers, infrastructure, etc. Computing devices 104 may be associated with participants in the audio conference 106. A participant may comprise a "host" or "participant" and such terms merely refer to different user roles or permissions associated with the audio conference 106. For example, the "host" may be the originator of the audio conference 106 and, consequently, may have user privileges that are not offered to the participants. Nonetheless, it should be appreciated that the terms "host," "participant," and "user" may be used interchangeably depending on the context in which it is being used.

The computing devices 104 may comprise any desirable computing device, which is configured to communicate with the conferencing system 102 and server(s) 112 via the communication networks. The computing device 104 may comprise, for example, a personal computer, a desktop computer, a laptop computer, a mobile computing device, a portable computing device, a smart phone, a cellular telephone, a landline telephone, a soft phone, a VoIP phone, a web-enabled electronic book reader, a tablet computer, or any other computing device capable of communicating with the conferencing system 102 and/or the server(s) 112 via one or more communication networks. The computing device 104 may include client software (e.g., a browser, plug-in, or other functionality) configured to facilitate communication with the conferencing system 102 and the server 112. It should be appreciated that the hardware, software, and any other performance specifications of the computing device 104 are not critical and may be configured according to the particular context in which the computing device 104 is to be used.

In the embodiment illustrated in FIG. 1, the computing device 104 may include network interface devices 122, a display 124, a microphone 126, a speaker 128, one or more input/output devices 130, and a processor 132 for executing software and/or firmware associated with a memory 134. The networking interface devices 122 enable the computing device 104 to communicate with the conferencing system 102 via any desirable communication networks. The microphone 126 and speaker 128 enable the participant to speak and listen to the audio conference 106. The web conference user interface 116 and the phone-only user interface 114 may be presented to and displayed via a graphical user interface and an associated display 124 (e.g., touchscreen display device or other display device).

In the embodiment of FIG. 1, the conferencing system 102 generally comprises a communication system for establishing an online conference (e.g., an audio conference 106) between the computing devices 104. The conferencing system 102 may support audio via a voice network and/or a data network. In one of a number of possible embodiments, the conferencing system 102 may be configured to support, among other platforms, a Voice Over Internet Protocol (VoIP) conferencing platform such as described in U.S. patent application Ser. No. 11/637,291 entitled "VoIP Conferencing," filed on Dec. 12, 2006, which is hereby incorporated by reference in its entirety. It should be appreciated that the conferencing system 102 may support various alternative platforms, technologies, protocols, standards, features, etc. Regardless of the communication infrastructure, the conferencing system 102 may be configured to establish an audio connection with computing devices 104, although in some embodiments the audio portion may be removed for one or more participants. The conferencing system 102 may establish the audio conference 106 by combining audio streams 118a-118c associated with associated computing 104 and corresponding participant identifiers 120a-120c.

The participant identifiers 120 may be stored in a database 144 with each participant identifier 120 having accompanying data structures for identifying a participant mode 140. Each participant identifier 120 is logically associated with a corresponding audio stream 118 that identifies the participant, and a particular audio connection to the appropriate computing device 104, and a user identifier from user profiles database. The user profiles database may store any suitable account information for the participants, as described in the above-referenced patent application. The participant mode 140 may be used to keep track of the current mode in which the participant is participating in the conference (i.e., phone-only mode 142 or web conference mode 144).

Conferencing system 102 may comprise one or more server(s) 112 that are configured to establish the audio conference 106 and control presentation of the user interfaces to the computing devices 104. A phone-only user interface 114 is presented to participants in the phone-only mode 142. A web conference user interface 116 is presented to participants in the web conference mode 144. The phone-only user interface 114 and the web conference user interface 116 may be presented via a client application (e.g., a browser 136, one or more browser plug-ins, and/or a special-purpose client). It should be appreciated that the phone-only user interface 114 and the web conference user interface 116 may include logic located and/or executed at the computing device 104, the conferencing system 102, server(s) 112, or any combination thereof, and may be presented to and displayed via a graphical user interface and an associated display 124 (e.g., touch-screen display device or other display device).

Conferencing system 102 may further comprise a location-based dialing module 134 and an audio connection monitoring & reconnection module 138. The location-based dialing module 134 and the audio connection monitoring & reconnection module 138 are described below with reference to FIGS. 8 & 9. In general, the location-based dialing module 134 and the audio connection monitoring & reconnection module 138 may be embodied in memory and executed by one or more processors. It should be appreciated that any aspects of the location-based dialing module 134 and the audio connection monitoring & reconnection module 138 may be stored and/or executed by the computing devices 104, the conferencing system 102, the servers 112, or other related server(s) or web services.

As described below in more detail, the location-based dialing module 134 (FIG. 8) comprises the logic and/or functionality for enabling the conferencing system 102 to recommend a preferred or optimal method for each participant to connect to the audio conference 106 based on, for example, a current location of their computing device 104. The current location may be used to determine and/or recommend a particular dial-in number or configure a desirable dial-out method.

The audio connection monitoring & reconnection module 138 (FIG. 9) comprises the logic and/or functionality for monitoring the participant audio connections during the audio conference 106 based on, for example, audio quality, connection quality, bandwidth, or cost considerations. If an alternative audio connection method is available, the conferencing system 102 may recommend that the participant reconnect via the alternative method.

Figure 2:
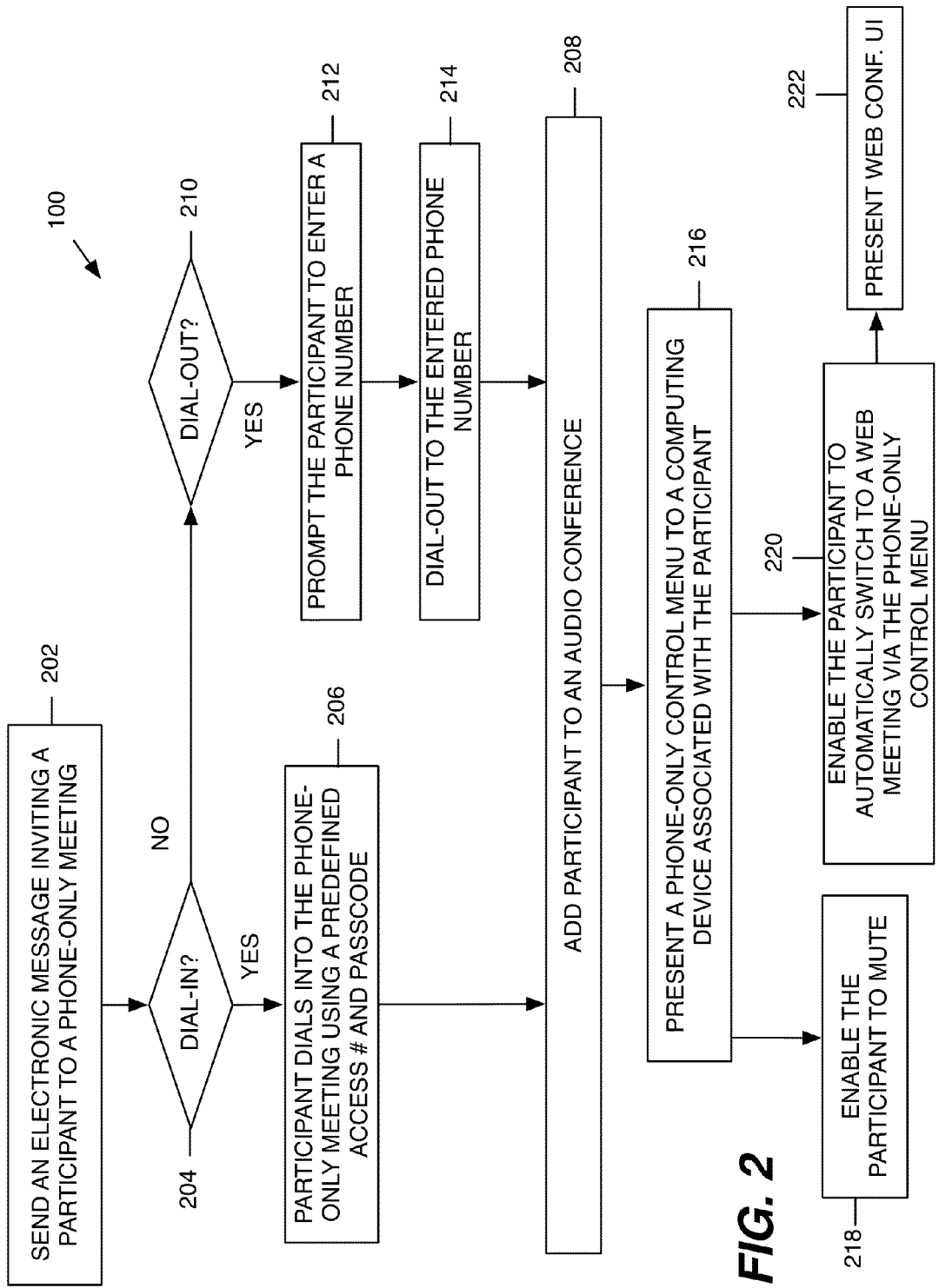
FIG. 2 is a flowchart illustrating an embodiment of a method for transitioning from a phone-only mode to a web conference mode via the conferencing system of FIG. 1.

FIG. 2 illustrates an embodiment of a method for enabling the participants to selectively transition from the phone-only mode to the web conference mode in a conference provided by the conferencing system 102. At block 202, the conferencing system 102 may send an electronic message inviting one or more participants to a phone-only meeting. The phone-only meeting may be designated for one or more participants in the conference. In an embodiment, the conference may be initially set-up as a phone-only meeting or a hybrid meeting where some participants join in the phone-only mode and other join in the web conference mode.

FIG. 3 illustrates an embodiment of an email message 300 transmitted to a phone-only participant. The email message 300 may display a date and time for the phone-only meeting along with a prompt to select from a plurality of available methods for joining the meeting. The participant may join the phone-only meeting via a computer (component 302), via a mobile phone (component 304), or via a particular mobile operating system platform (component 306). The participant may join the meeting by selecting the particular method directly within the email message 300. The email message 300 may also display dial-in information (e.g., a dial-in access number 308, guest passcode 310) for enabling the particular to join the meeting via a dial-in feature. The email message 300 may also include a portion 312 comprising a web address for accessing the phone-only user interface 114. The participant may enter the web address into the browser 136 or otherwise select an embedded link in the email message 300.

The phone-only participant may also join the meeting via a dial-out feature. FIG. 3 illustrates a screen shot of an exemplary user interface 400 for implementing the dial-out feature. The user interface 400 may be incorporated into the email message 300 or included as an initial screen when accessing the web address for the phone-only user interface 114. The user interface 400 may comprise various inputs to input, for example, the participant's name (text box 402), email (text box 404), country code (drop-down menu 406), or phone number (text box 408). One or more of the inputs may be pre-populated with the participant's default information from a profiles database. After inputting and/or confirming the information, the participant may initiate a dial-out feature by selecting a "connect me" button 410. In response, the conferencing system 102 may dial the phone number from text box 408 to add the participant to the audio conference 106. The participant may bypass the dial-out feature and instead join using the dial-in feature described above by selecting a button 412.

Referring again to the method of FIG. 2, if the dial-in feature is used (decision block 204), the participant dials into the phone-only meeting using a predefined access number and passcode. If the dial-out feature is used (decision block 210), the conferencing system 102 may prompt the participant to enter a phone number (block 212) and then dial-out to the entered phone number (block 214). Regardless the method of joining the meeting, at block 208, the participant is added to the audio conference 106 in the phone-only mode 142 (i.e., a phone-only participant). At block 216, the conferencing system 102 presents a phone-only control menu to a computing device 104 associated with the phone-only participant.

Figure 5:
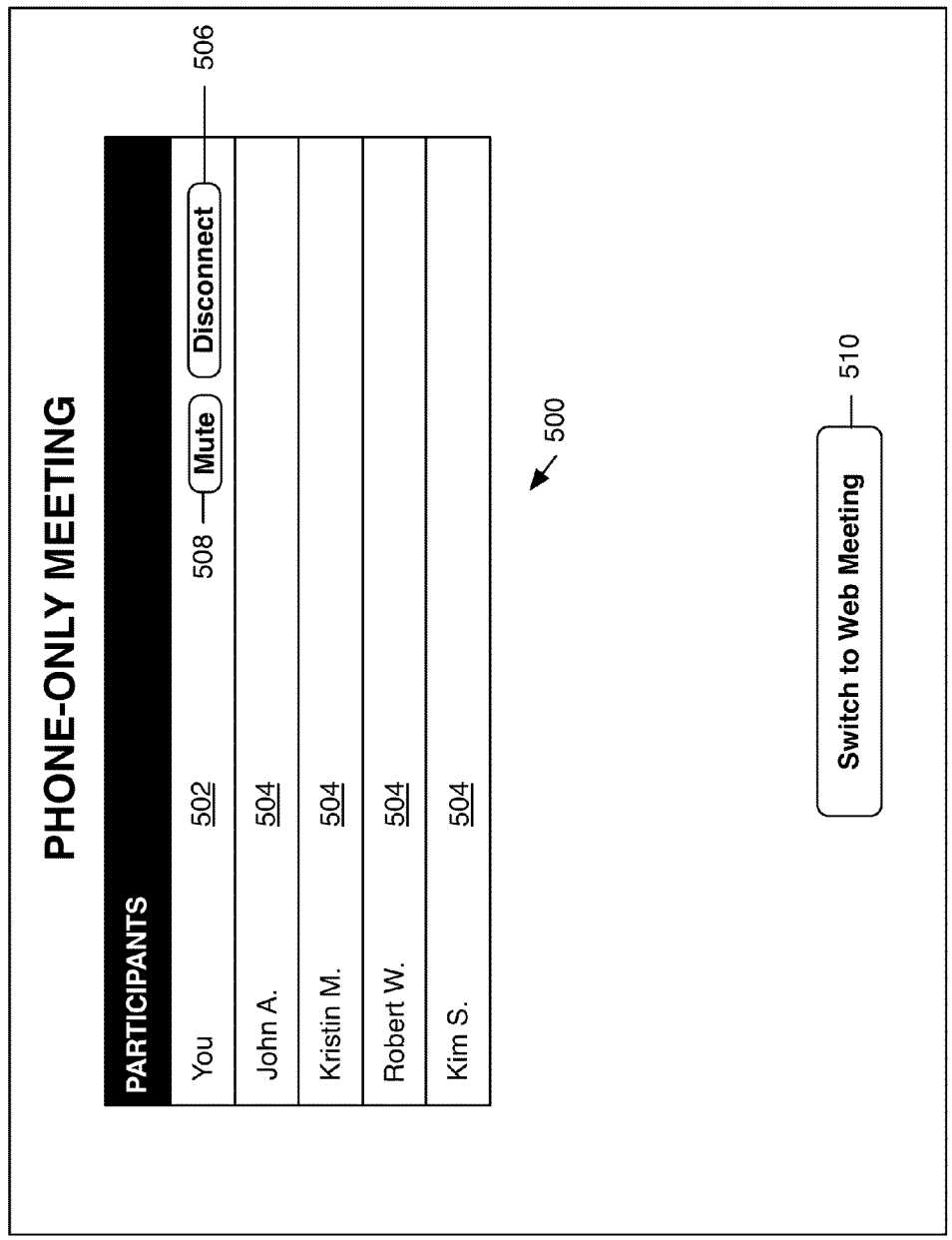
FIG. 5 is a screen shot illustrating an embodiment of the phone-only user interface of FIG. 1.

FIG. 5 illustrates an embodiment of a phone-only control menu comprising the phone-only user interface 114. As illustrated in FIG. 5, the phone-only user interface 114 may comprise a simplified user experience for accessing a limited set of control features related to the audio conference 106. The phone-only user interface 114 may comprise a list 500 of the participants in the audio conference 106. The name or other information associated with each participant may be displayed in separate items. The participant viewing the phone-only user interface 114 may be identified in item 502 and the other participants identified in separate items 504. Item 502 may comprise a limited set of user interface controls. The limited controls may provide audio-only controls without any conventional web conference features, such as, for example, screen sharing, conferencing applications, etc. In an embodiment, the item 502 may comprise a mute/unmute button 508 and a disconnect button 506. The mute/unmute button 508 enables the participant to mute or unmute their audio connection (block 218—FIG. 2).

It should be appreciated that the phone-only user interface 114 may provide a convenient and desirable means for participating in the online conference without the need for a more complicated web conference user interface 116. For example, the phone-only user interface 114 may be preferred on certain types of computing devices 104 where the screen size, resolution, and/or hardware/software specifications make it problematic or undesirable to use the web conference user interface 116.

Referring again to FIG. 2, at block 220, the phone-only user interface 114 may further comprise a user interface control (e.g., button 510) for enabling the phone-only participant to selectively transition from the phone-only mode 142 to the web conference mode 144. The participant may initiate a transition request via the phone-only user interface 114. The transition request is received by the conferencing system 102 and/or associated servers 112. In response to the transition request, the participant mode 140 may be changed from phone-only mode 142 to web conference mode 144. At block 222, the conferencing system 102 presents the web conference user interface 116 to the computing device 104 instead of the phone-only user interface 114.

Figure 6:
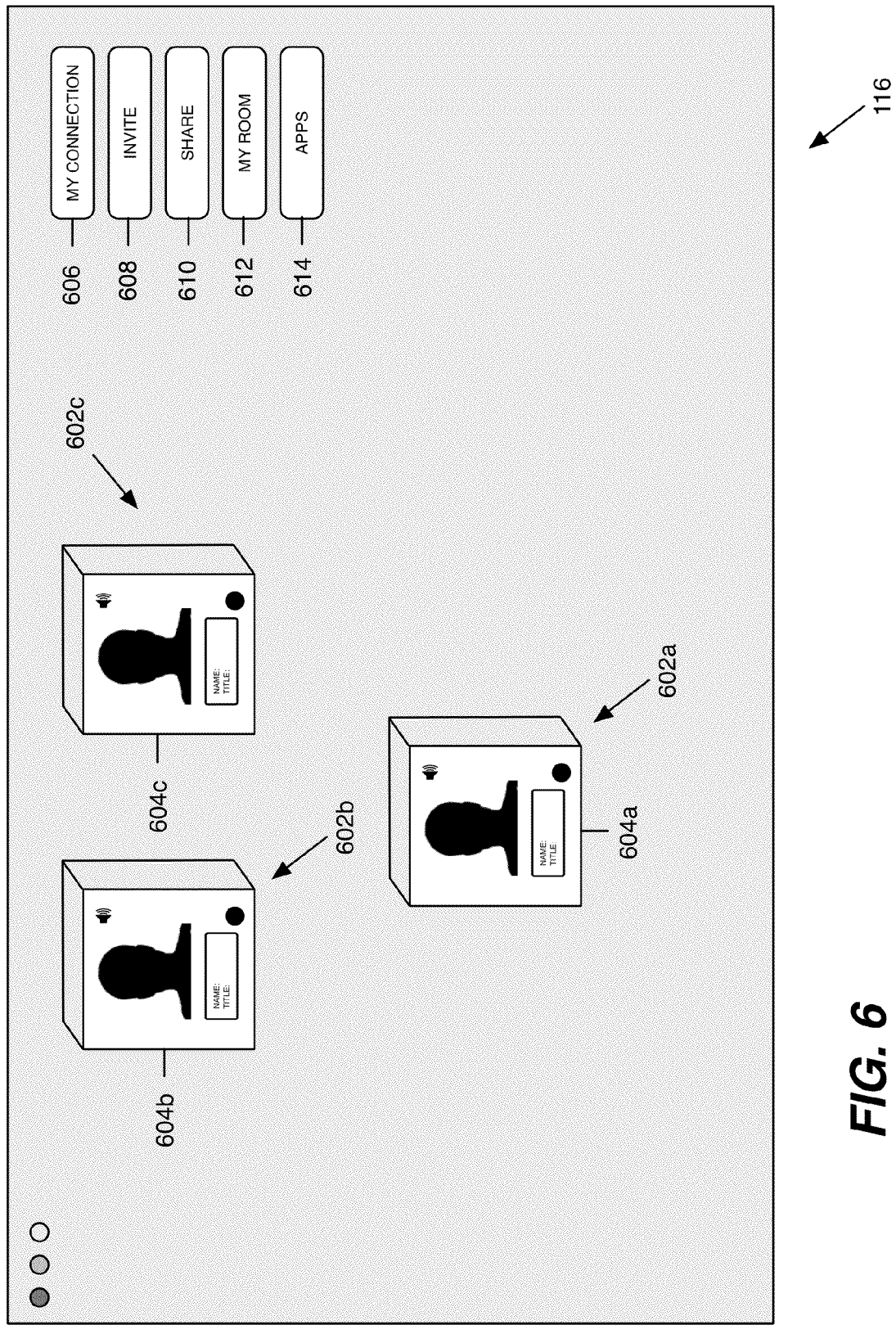
FIG. 6 is a screen shot illustrating an embodiment of the web conference user interface of FIG. 1 presented in response to selection of the "switch to web meeting" control in FIG. 5.

FIG. 6 illustrates an embodiment of an exemplary web conference user interface 116 presented to the computing device 104. The web conference user interface 116 may be configured and operate in a manner similar to the conference user interface described in the above-referenced parent application. It should be appreciated, however, that alternative embodiments may be used, including, for example, any conventional or other user interfaces used in web-based conferences, native applications designed for mobile device operating systems, plug-ins, desktop applications, etc. As illustrated in the embodiment of FIG. 6, the web conference user interface 116 may visually identify each participant in the conference with an interactive participant object 602. A first participant may be identified with participant object 602a, a second participant by participant object 602b, and a third participant by participant object 602c. The participant objects 602 may comprise a default display 604 for displaying a graphic, icon, avatar, or photograph of the participant, as well as the participant's name, title, or any other customizable information.

Figure 7:
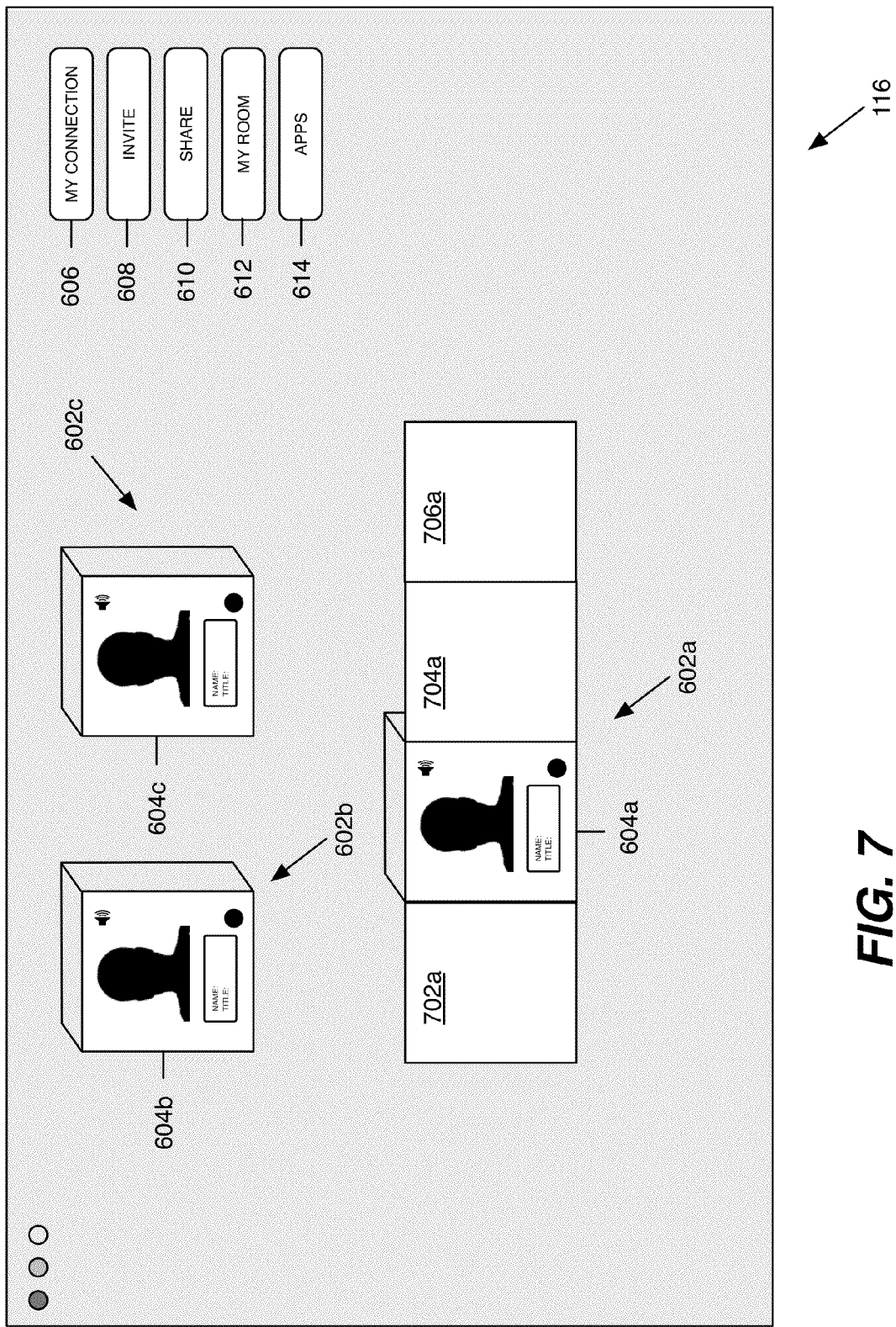
FIG. 7 illustrates one of the interactive participant objects of FIG. 6 displaying expandable display faces in response to a user selection.

The interactive participant objects 602 may comprise one or more user-selectable display portions for presenting participant information or related features. The interactive participant objects 602 may comprise a cube or other shape having a plurality of display faces 604. When a participant selects a user interface component, the cube may be expanded to display one or more expandable display faces. FIG. 7 illustrates the web conference user interface 116 in which a participant object 602a has been selected by one of the participants. The user selection may trigger the display of cube faces 702a, 704a, and 706a. Each face may display additional information about the associated participant. In an embodiment, the cube faces may be configurable by the participant and may display, for example, a social networking profile, updates to a social networking communication feed, video, graphics, images, or any other content. The cube faces may be further selected to return to the original collapsed cube. In another embodiment, the participant object 602 may be rotated (either automatically or via user selection) to display the respective cube faces 702a, 704a, and 706a. It should be appreciated that the participant objects 602 may be configured with various visual effects and/or interactive functionality.

As further illustrated in FIGS. 6 & 7, the web conference user interface 116 may comprise one or more selectable components for accessing various conferencing features. A my connection component 606 may launch a display for enabling a participant to configure the existing connection between the computing device 104 and the conferencing system 102. The participant may disconnect a connection to the audio conference 106, establish a new connection to the audio conference 106 (e.g., by dial-out), or reconfigure the existing connection to the audio conference 106.

An invite component 608 may launch a menu for enabling a participant to invite additional participants to the online conference. Additional participants may be invited by, for example, dialing out to a telephone number, sending an email including information for accessing the conferencing system 102, or sending a message to a web service, such as, for example, a social networking system. A share component 610 may launch a menu (not shown) for enabling a participant to insert and share media with other participants in the online conference.

A my room component 612 may launch a display for enabling a participant to configure the appearance of the user interface 116. In an embodiment, the participant may configure the arrangement of the participant objects 602, specify a location view (as described in the above-referenced patent application), or configure any other presentation parameter.

An apps component 614 may launch a menu for enabling a participant to launch, view, or purchase various conference applications provided by the conferencing system 102.

Figure 8:
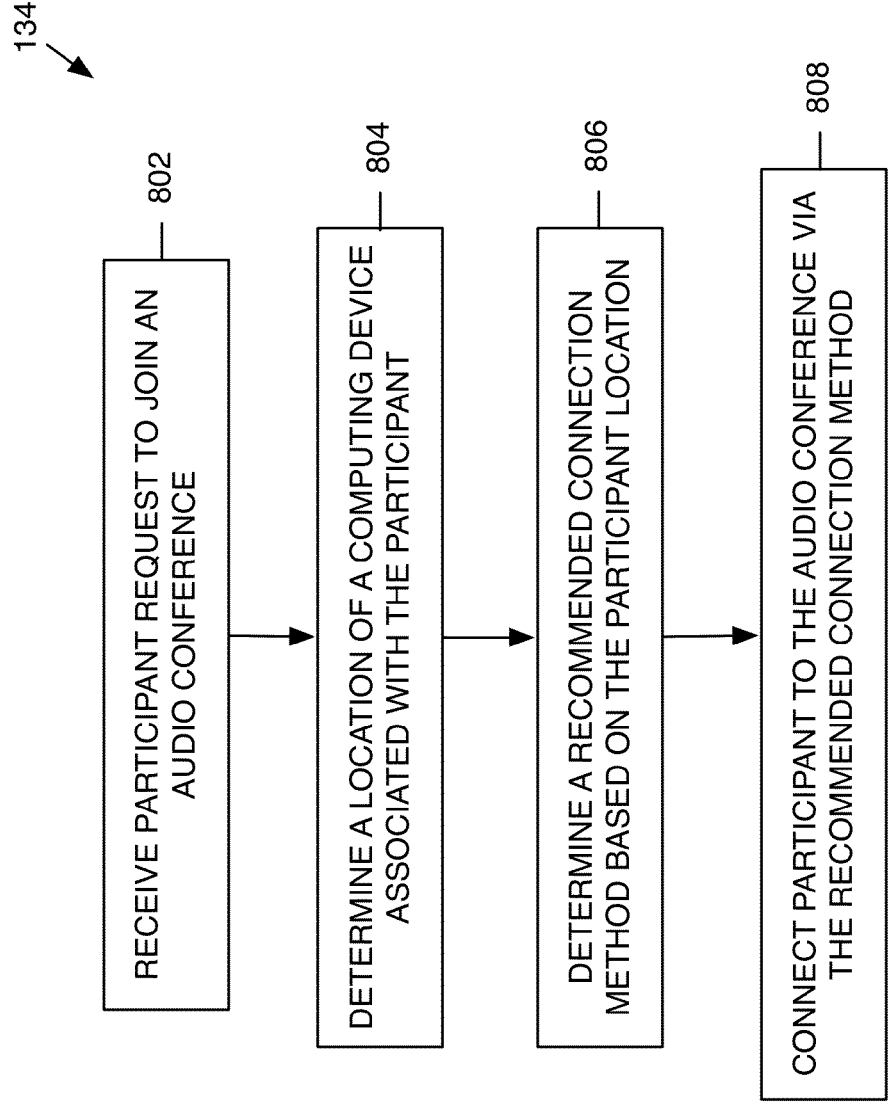
FIG. 8 is a flowchart illustrating the architecture, operation, and/or functionality of an embodiment of the location-based dialing module of FIG. 1.

As mentioned above, the conferencing system 102 may support various means for connecting to the audio conference 106. The location-based dialing module 134 enables the conferencing system 102 to recommend a preferred or optimal method for each participant to connect to the audio conference 106 based on, for example, a current location of their computing device 104. The current location may be used to determine and/or recommend a particular dial-in number or configure a desirable dial-out method. FIG. 8 illustrates an embodiment of the architecture, operation, and/or functionality of the location-based dialing module 134. At block 802, the conferencing system 102 receives a request to join an audio conference 106. The request may originate from, for example, the email message 300 (FIG. 3), the user interface 400 (FIG. 4), or otherwise. At block 804, the conferencing system 804 determines a current location of the computing device 104. The current location may be determined from the IP address of the computing device 104, a location provided via an embedded GPS transceiver on the computing device 104, or manually via the user interfaces 114 or 116. At block 806, the conferencing system 102 determines a desirable method for connecting the participant to the audio conference 106. For example, the conferencing system 102 may select a particular dial-in number based on the current location. In other embodiments, it may be recommended to connect via the dial-out feature. The conferencing system 102 may prompt the participant to select a recommended connection method or automatically provision an optimal connection method. At block 808, the conferencing system 102 connects the participant to the audio conference 106 via the selected and/or recommended method based on the participant's current location.

Figure 9:
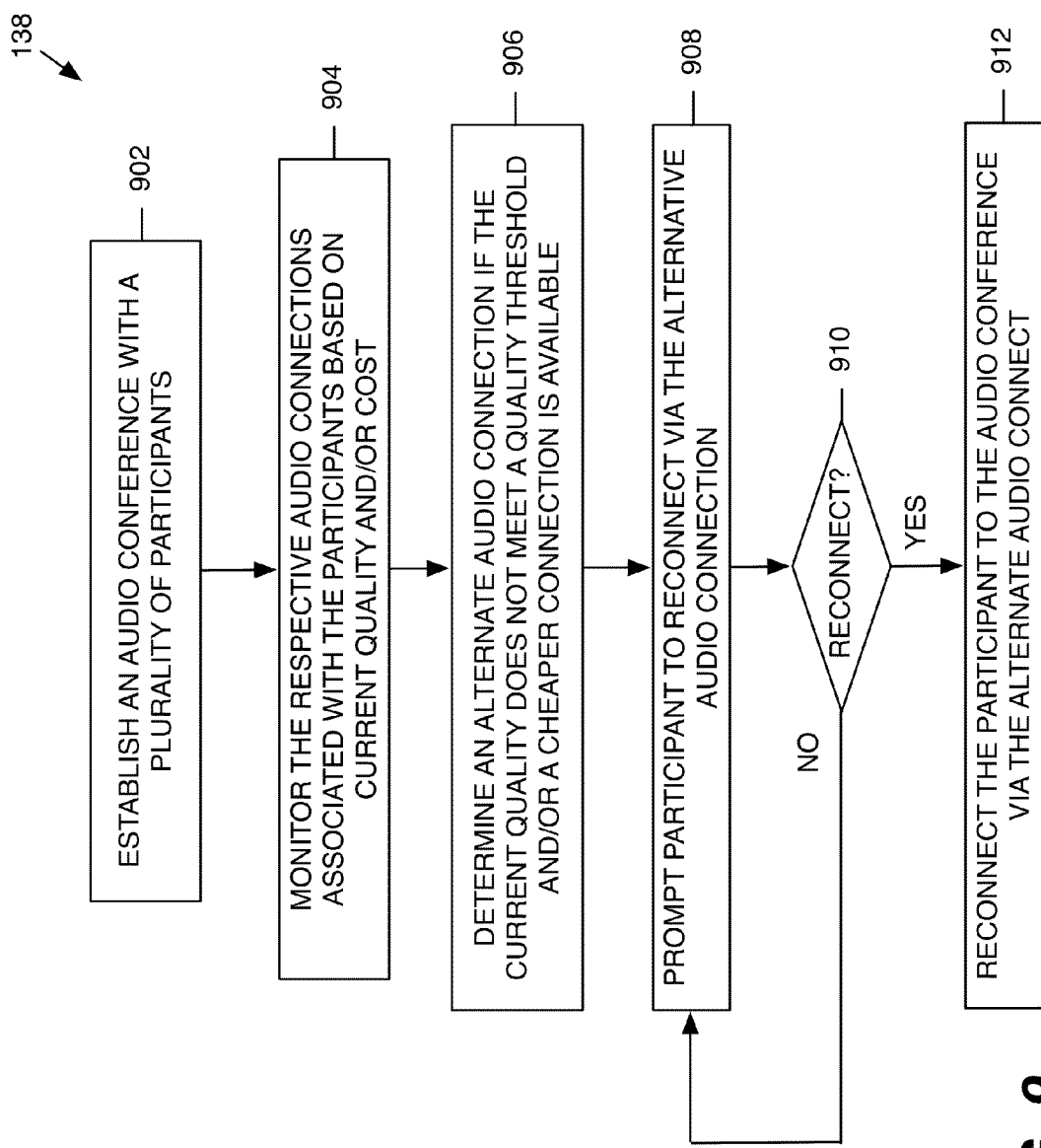
FIG. 9 is a flowchart illustrating the architecture, operation, and/or functionality of an embodiment of the audio connection monitoring & reconnection module of FIG. 1.

In other embodiments, the conferencing system 102 may monitor the participant audio connections, during the audio conference 106, and recommend alternative connection methods to improve audio quality and/or reduce the overhead or cost associated with providing the audio conference 106. FIG. 9 illustrates the architecture, operation, and/or functionality of an embodiment of the audio connection monitoring & reconnection module 138. At block 902, the conferencing system 102 establishes an audio conference 106 between a plurality of participants via a communication network. At block 904, the audio connection monitoring & reconnection module 138 monitors the respective audio connections based on, for example, audio quality, connection quality, network bandwidth, cost considerations, bridge loads, etc. At block 906, an alternative audio connection is determined. In an embodiment, threshold conditions for quality, cost, or other variables may be determined. If a threshold is not satisfied, an alternative or cheaper connection method may be identified. At block 908, the conferencing system 102 may prompt the participant to reconnect via the alternative connection method. In alternative embodiments, the conferencing system 102 may be configured to automatically provision the alternative audio connection. If the participant is to be reconnected (decision block 910), the conferencing system 102 reconnects the participant to the audio conference 106 via the alternative connection method.

It should be appreciated that one or more of the process or method descriptions associated with the flow charts or block diagrams above may represent modules, segments, logic or portions of code that include one or more executable instructions for implementing logical functions or steps in the process. It should be further appreciated that the logical functions may be implemented in software, hardware, firmware, or any combination thereof. In certain embodiments, the logical functions may be implemented in software or firmware that is stored in memory or non-volatile memory and that is executed by hardware (e.g., microcontroller) or any other processor(s) or suitable instruction execution system associated with the computer system 100. Furthermore, the logical functions may be embodied in any computer readable medium for use by or in connection with an instruction execution system, apparatus, or device, such as a computer-based system, processor-containing system, or other system associated with the computer system 100 that can fetch the instructions from the instruction execution system, apparatus, or device and execute the instructions.

It should be noted that this disclosure has been presented with reference to one or more exemplary or described embodiments for the purpose of demonstrating the principles and concepts of the invention. The invention is not limited to these embodiments. As will be understood by persons skilled in the art, in view of the description provided herein, many variations may be made to the embodiments described herein and all such variations are within the scope of the invention.

What is claimed is:

1. A method for participating in an audio conference, the method comprising:
    a conferencing system establishing an audio conference between a plurality of participants via a communication network, at least one of the participants participating in the audio conference in a phone-only mode as a phone-only participant and a remaining portion of the participants participating in the audio conference in a web conference mode; and
    a server in communication with the conferencing system presenting a phone-only user interface to a computing device associated with the phone-only participant, the phone-only user interface comprising a phone-only control menu for enabling the phone-only participant to selectively transition from the phone-only mode to the web conferencing mode via the computing device, wherein the transition from the phone-only mode to the web conferencing mode comprises automatically replacing the phone-only user interface presented to the computing device with a web conference user interface presented to the computing device.

2. The method of claim 1, wherein the phone-only control menu comprises a list identifying the participants, a mute/unmute control, a disconnect control, and a switch mode control for requesting the transition from the phone-only mode to the web conferencing mode.

3. The method of claim 1, further comprising:
    receiving a transition request via the phone-only control menu;
    in response to transition request, the server presenting the web conference user interface to the computing device.

4. The method of claim 1, wherein the web conference user interface displays a plurality of interactive participant objects uniquely identifying each of the participants in the audio conference.

5. The method of claim 4, wherein the interactive participant objects comprise at least two expandable display portions for selectively displaying information associated with the corresponding participant.

6. The method of claim 5, wherein a first expandable display portion comprises a business card component and a second expandable display portion comprises social networking information.

7. The method of claim 4, wherein the interactive participant objects comprise a plurality of selectable display faces for displaying information about the corresponding participant.

8. The method of claim 4, wherein the interactive participant objects comprise an interactive cube having a default face for displaying an image of the participant, and two or more expandable faces for selectively displaying one or more of participant images, a business card component, photographs associated with the participant, and a social networking feed associated with the participant.

9. The method of claim 1, wherein the phone-only participant joins the audio conference via one of a dial-in number or a dial-out feature.

10. The method of claim 9, wherein the dial-in number is based on a current location of the computing device associated with the phone-only participant.

11. The method of claim 10, wherein the current location of the computing device is determined via one of an IP address associated with the computing device or a GPS location.

12. The method of claim 1, wherein the phone-only control menu is provided via a web browser.

13. The method of claim 1, further comprising:
    monitoring a quality or cost of an audio connection associated with the phone-only participant;
    based on the quality or cost, determining an alternative audio connection; and
    prompting the phone-only participant via the phone-only control menu to reconnect to the audio conference via the alternative audio connection.

14. The method of claim 13, wherein the alternative audio connection comprises one of an alternative dial-in number or a dial-out feature.

15. The method of claim 13, further comprising:
    receiving a request via the phone-only control menu to reconnect via the alternative audio connection; and
    connecting the phone-only participant to the audio conference via the alternative audio connection.

16. A computer program embodied in a computer readable medium and executable by a processor for providing an audio conference, the computer program comprising logic configured to:
    establish an audio conference between a plurality of participants via a communication network, at least one of the participants participating in the audio conference as a phone-only participant in a phone-only mode, via a phone-only user interface, and a remaining portion of the participants participating in a web conference mode, via a separate web conference user interface, the phone-only mode restricting access to web conference features provided via the web conference user interface;

present the phone-only user interface to a computing device associated with the phone-only participant, the phone-only user interface comprising a phone-only control menu for enabling the phone-only participant to selectively transition from the phone-only mode to the web conferencing mode via the computing device;

receive the transition request initiated via the phone-only control menu; and in response to the transition request, change the phone-only participant from the phone-only mode to the web conference mode and automatically replace the phone-only user interface resented to the computing device with the web conference user interface computing device.

17. The computer program of claim 16, wherein the phone-only control menu comprises a list identifying the participants, a mute/unmute control, a disconnect control, and a switch mode control for requesting the transition from the phone-only mode to the web conferencing mode, and the web conference user interface provides a screen sharing feature restricted to the web conference mode.

18. The computer program of claim 16, wherein the phone-only participant joins the audio conference via one of a dial-in number or a dial-out feature based on a current location of the computing device.

19. The computer program of claim 16, further comprising logic configured to:

monitor a quality or cost of an audio connection associated with the phone-only participant;

based on the quality or cost, determine an alternative audio connection;

receiving a request via the phone-only control menu to reconnect via the alternative audio connection; and connect the phone-only participant to the audio conference via the alternative audio connection.

20. The computer program of claim 19, wherein the alternative audio connection comprises one of an alternative dial-in number or a dial-out feature.

21. A computer system comprising:

a conferencing system for establishing an audio conference between a plurality of participants via a communication network, wherein the participants participate as a phone-only participant in a phone-only mode or in a web conference mode; and a server configured to communicate with the conferencing system and present a phone-only user interface to a computing device associated with the phone-only participant, the phone-only user interface restricting access to one or more web conference features provided via a separate web conference user interface to participants in the web conference mode, the phone-only user interface comprising a phone-only control menu for enabling the phone-only participant to selectively transition from the phone-only mode to the web conferencing mode via the computing device, wherein the transition comprises the conferencing system changing the phone-only participant from the phone-only mode to the web conference mode and automatically presenting the web conference user interface to the computing device.

22. The computer system of claim 21, wherein the web conference mode enables only the corresponding participants to access the web conference features presented via the web conference user interface and the server is further configured to:

receive the transition request initiated via the phone-only control menu; and in response to the transition request, present the web conference user interface to the computing device.

23. The computer system of claim 21, wherein the phone-only control menu comprises a list identifying the participants, a mute/unmute control, a disconnect control, and a switch mode control for requesting the transition from the phone-only mode to the web conferencing mode.

24. The computer system of claim 21, wherein the phone-only participant joins the audio conference via one of a dial-in number or a dial-out feature based on a current location of the computing device.

25. The computer system of claim 21, wherein the conferencing system of the server is further configured to:

monitor a quality or cost of an audio connection associated with the phone-only participant;

based on the quality or cost, determine an alternative audio connection;

receive a request via the phone-only control menu to reconnect via the alternative audio connection; and connect the phone-only participant to the audio conference via the alternative audio connection.

26. The computer system of claim 25, wherein the alternative audio connection comprises one of an alternative dial-in number or a dial-out feature.

27. The computer system of claim 25, wherein the phone-only participant joins the audio conference via one of a dial-in number or a dial-out feature.

28. The computer system of claim 27, wherein the dial-in number is based on a current location of the computing device associated with the phone-only participant.

29. The computer system of claim 28, wherein the current location of the computing device is determined via one of an IP address associated with the computing device or a GPS location.

* * * * *